(12) United States Patent
Babaian et al.

(10) Patent No.: US 6,584,611 B2
(45) Date of Patent: Jun. 24, 2003

(54) CRITICAL PATH OPTIMIZATION—UNLOAD HARD EXTENDED SCALAR BLOCK

(75) Inventors: Boris A. Babaian, Moscow (RU);
Sergey K. Okunev, Moscow (RU);
Vladimir Y. Volkonsky, Moscow (RU)

(73) Assignee: Elbrus International Limited, George Town (KY)

( * ) Notice: Subject to any disclaimer, the term of this patent is extended or adjusted under 35 U.S.C. 154(b) by 0 days.

(21) Appl. No.: 09/771,481

(22) Filed: Jan. 25, 2001

(65) Prior Publication Data
US 2001/0052120 A1 Dec. 13, 2001

Related U.S. Application Data

(63) Continuation of application No. 09/506,408, filed on Feb. 17, 2000.
(60) Provisional application No. 60/120,353, filed on Feb. 17, 1999, provisional application No. 60/120,357, filed on Feb. 17, 1999, provisional application No. 60/120,448, filed on Feb. 17, 1999, provisional application No. 60/120,527, filed on Feb. 17, 1999, provisional application No. 60/120,649, filed on Feb. 17, 1999, and provisional application No. 60/120,375, filed on Feb. 17, 1999.

(51) Int. Cl.[7] ................................................. G06F 9/45
(52) U.S. Cl. ...................................................... 717/155
(58) Field of Search ................................. 717/155, 159

(56) References Cited

U.S. PATENT DOCUMENTS

| | | | |
|---|---|---|---|
| 4,965,724 A | * 10/1990 | Utsumi et al. ............... | 717/146 |
| 5,202,975 A | * 4/1993 | Rasbold et al. .............. | 709/305 |
| 5,307,478 A | * 4/1994 | Rasbold et al. .............. | 709/305 |
| 5,557,761 A | * 9/1996 | Chan et al. ................... | 717/136 |
| 5,625,835 A | 4/1997 | Ebcioglu et al. ............... | 712/23 |
| 5,684,994 A | * 11/1997 | Tanaka et al. ................ | 717/153 |
| 5,758,051 A | 5/1998 | Annen et al. .................. | 714/2 |
| 5,835,776 A | * 11/1998 | Tirumalai et al. ............ | 717/150 |
| 5,958,048 A | * 9/1999 | Babaian et al. .............. | 712/241 |
| 6,247,173 B1 | * 6/2001 | Subrahmanyam ............ | 717/150 |

FOREIGN PATENT DOCUMENTS

EP      0535107 B1  *  4/1993  ............. G06F/9/45

OTHER PUBLICATIONS

"A Framework for Balancing Control Flow and Predication," August et al., 1072–4451/97©IEEE.

Malkhe, S. A., Lin, D. C., William, Y. C., Hank, R. E., Bringmann, R. A., *Effective Compiler Support for Predicated Execution Using the Hyperblock*, Center for Reliable and High–Performance computing, University of Illinois, Urbana–Champaign, IL 61801.

* cited by examiner

*Primary Examiner*—Kakali Chaki
*Assistant Examiner*—John Q. Chavis
(74) *Attorney, Agent, or Firm*—Townsend and Townsend and Crew LLP

(57) ABSTRACT

A method, implemented in a compiler, of balancing the workload between blocks in a control flow to reduce the overall execution time of control block includes steps for identifying "hard" blocks the consume excess resources, selecting hard block to unload, and unloading critical operations from a hard block to a control flow predecessor.

19 Claims, 4 Drawing Sheets

Example of unload hard Extended Scalar Block.

Block before unload height = H0

Block after unload height = H0 - Hm

Subgraph of critical operations which was migrated out of ESB height = Hm

CRITICAL PATH OPTIMIZATION— UNLOAD HARD EXTENDED SCALAR BLOCK

CROSS-REFERENCES TO RELATED APPLICATIONS

This application is a continuation of and claims the benefit of U.S. application Ser. No. 09/506,408, filed Feb. 17, 2000, which is a continuation of U.S. applications Ser. Nos. 60/120,353, 60/120,357, 60/120,375, 60/120,448, 60/120,527 and 60/120,649, all filed Feb. 17, 1999, the disclosures of which are each incorporated herein by reference.

BACKGROUND OF THE INVENTION

Compiler optimization has as its goal transforming code to increase its performance. One important factor in optimization is scheduling operations to increase the speed of program execution by utilizing predicated and speculative operations. The present invention relates to optimizing code executed on an Explicit Parallel Instruction Computing (EPIC) architecture with full predication and speculation support and performs the global task of detecting and refining potential parallelism of the source code being compiled.

The present compiler transforms the source-code program represented as a set of Basic Blocks into Extended Scalar Blocks (ESBs) by applying a compiler technique called if-conversion which replaces conditional branches in the code with comparison instructions which set a predicate. Each predicated instruction is guarded by a Boolean source operand having a value which determines whether the instruction is executed or nullified.

Extended Scalar Blocks are regions of the predicated code where all dependencies between operations are represented explicitly as a relation between two operations for a considerable number of operations. For each ESB the compiler works out the critical path which is defined as a sequence of operations that will take the longest CPU time and cannot be executed in parallel because of dependencies.

The ESBs ale blocks in a control flow graph where control may enter only from the top but may exit from one or more locations. A control flow graph is a set of nodes and directed edges. For an ESB, a node represents some speculative and predicated code that is executed from the beginning of the block to one of its exits. An edge between a first node and a second node indicates that the first node may pass control to a second node. FIG. 1 depicts a control flow indicating some properties of the ESB. The ESB is preceded by control flow predecessor blocks CFP 1 and 2. Note that control only enters from the top of the ESB. In this example control exits from the side and bottom of the ESB to control flow successors CFS 1 and 2.

ESBs may have different lengths and summary run times depending on various factors such as the execution counter, the number of operations, and dependencies between them. The executable code will be more efficient when the execution workload is balanced between blocks in the control flow, i.e, the execution workload of some "hard" blocks will be thrown on to other ones, which are executed less frequently and/or have some free execution resources.

Migration of operations from between Basic Blocks (blocks not in predicated form) are disclosed in U.S. Pat. No. 5,557,761. However, no techniques applicable to ESBs are disclosed. Accordingly, existing compilers do not have facilities for efficiently balancing the ESBs in the control flow.

SUMMARY OF THE INVENTION

According to one aspect of the invention, a variant of code motion optimization is developed for more powerful regions than Basic Blocks, i.e., for Extended Scalar Blocks, which are a predicated form of the intermediate representation of a program based on such features of modem architectures as speculative execution, full predicated execution and enough processor resources for instruction level parallelism (ILP). Therefore, optimization is performed on a considerable number of operations with explicitly expressed dependencies between the operations, that gives more precise criteria to select "hard" regions (taking into account profiling information) and to select needed amount of migrated operations.

According to another aspect of the invention, the "hardness" of various blocks in a control flow is analyzed to identify which blocks consume more than a threshold level of execution resources. Blocks identified are then analyzed to determine whether resource consuming operations can be "unloaded" to be executed in parallel with operations of the blocks which are control flow predecessors.

According to another aspect of the invention, operations are unloaded to control flow predecessors when the predecessors have free resources to execute the unloaded operations without increasing the overall execution time of the program.

According to one aspect of the invention, an optimizing compiler includes code for migrating operations out of a hard ESB, i.e., an ESB having an excessive number of operations, to control flow predecessors of the hard ESB.

According to another aspect of the invention, critical operations are identified in a hard ESB and successively migrated out of the hard ESB to reduce its height.

According to another aspect of the invention, criteria for identifying critical operations include determining whether an operation requires either dynamic memory access, multiple cycles, or has a large number of successors.

According to another aspect of the invention, migrated operations are followed by a register write operation in the predecessor block and replaced by a register read operation in the hard ESB.

According to another aspect of the invention, operations migrated to a control flow predecessor block store result operands in virtual registers and critical operations in a source block are replace by read operations.

Other features and advantages of the invention will be apparent in view of the following detailed description and appended drawings.

DETAILED DESCRIPTION OF THE PREFERRED EMBODIMENTS

Preferred embodiments of the invention will now be described. The optimizing compiler creates ESBs based on heuristics or algorithms implemented by the compiler with a goal to increase the execution speed of a program. An important factor in defining a block is the size of the block. Large blocks utilize many machine resources and thus may reduce the performance of the optimized code. Often the optimum size of a block depends on the particular platform on which the code is executed.

In one embodiment, a method for "unloading" a hard Extended Scalar Block reduces the time required to execute the block by providing a more uniform and parallel distribution of operations from this ESB to others, i.e., its control flow predecessors.

A first step in the method is defining which ESBs are "hard" ESBs. This is done by assigning a hardness parameter to the ESBs and comparing the hardness parameter to a specified threshold and/or to the hardness parameters of other blocks.

One method of defining the hardness parameter is to utilize probes, i.e., subprograms patched into user-specified locations of the executable program, that profile the program to generate execution counters that give exact estimates of program behavior and define regions of the most frequently executed code. This hardness parameter is designated as "C".

A second technique is to estimate the hardness of the block by the relationship between the number of operations in the ESB and the available processor resources available to execute the operations. This parameter is calculated by estimating the product of the block in cycles and the number of arithmetic channels in the processor and is designated "W".

The second step is to determine which ESBs to unload. One goal of unloading is to balance the work flow among a chain of ESBs so that the total time of execution is reduced. To accomplish this result the "hardness" parameters of a target block and its control flow predecessors are examined. For example, if a target block with a high hardness parameter is preceded by a predecessor block with a low hardness parameter it may be possible to unload some operations from the target block to be executed in parallel with operations of the predecessor block without increasing the execution time of the predecessor block. If the execution time of the target is substantially reduced then an overall reduction time for both blocks has been achieved.

An exemplary algorithm to determine which target blocks to unload will now be described. For a target block, designated Bpred, if $C(B)>C0$, and $W(B)>W0$ then B becomes a target block. An unload may be applied to a target block B under the following conditions: for each predecessor of B, designated Bpred ($C(B)>>C(Bpred)$) or ($C(B) \geq C(Bpred)$) and ($W(B)-W(Bpred)>Wdiff0$)). In the above C0, W0, and Wdiff0 are external boundary parameters.

Figure 1:
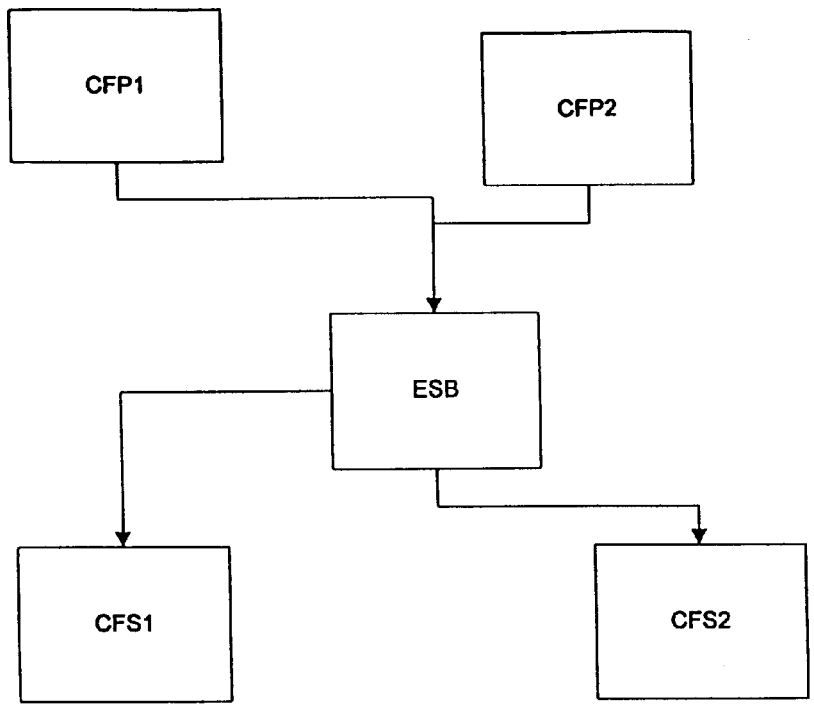
FIG. 1 is a block diagram depicting an ESB in a control flow graph.
Figure 2:
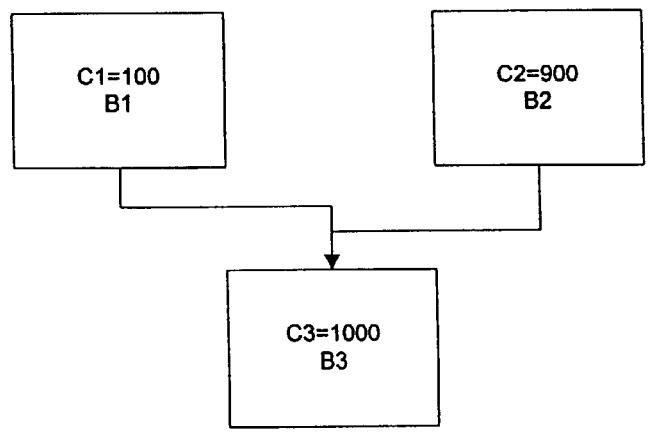
FIGS. 2 and 3 are block diagrams of a hard ESB and control flow predecessors.
Figure 3:
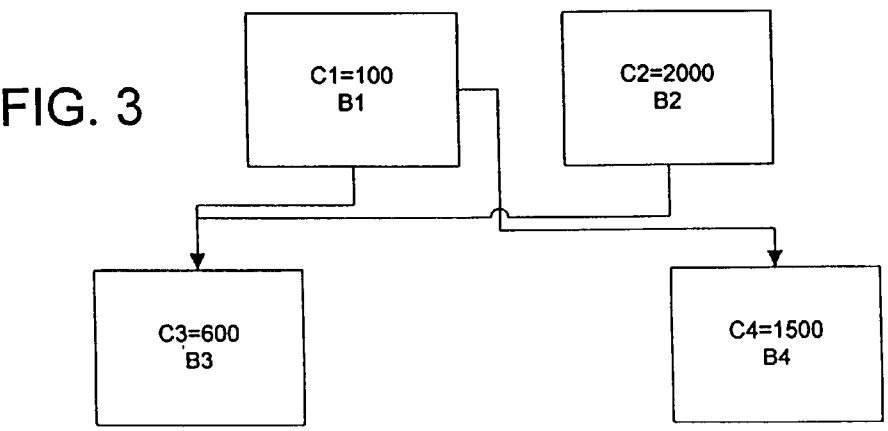

FIGS. 2 and 3 depict two examples. In FIG. 2 B1 and B2 are predecessors of B3. In this case, $C3>>C1$ and $C3>C2$ so that B3 can be unloaded to a control flow predecessor should $W(B3)-W(B2)>Wdiff0$. In this case unloading operations from B3 to a control flow predecessors should reduce execution time by balancing the execution load between the blocks. In FIG. 3, B3 can not be unloaded because $C3<C2$.

After identifying hard Extended Scalar Blocks to unload, some set of critical operations is migrated iteratively from this ESB to its control flow predecessors. At every step a critical operation is defined in dependence on the type of operation, the number of its data flow successors, and the latest start time of the operation. Operations with dynamic access time (load), with more operation delay (for example, divide, square root), and with many data flow successors (greater than two) are preferred as candidates for migration. After critical operations from the candidates for migration have been identified, a chosen operation with its argument tree operations are copied and inserted by a recursive pass to each control flow predecessor block and the result of the copy is kept on a virtual register (the virtual compiler variable). Then all usages of the critical operation result (data flow successors) in the hard block are replaced by read (or usage) of this virtual register and the critical operation is removed. Each operation of the critical operation argument tree is removed too, if its result is not used after transformation. The defining and motion process iterates under the condition that the difference between the height of the block after transformation and the initial height of the block is less than a given difference, and the number of iterations is less than an upper boundary of the number of iterations depending on the estimation of the hard Extended Scalar Block.

Once a target block has been designated for unloading, the compiler heuristically decides which operations to unload into control flow predecessors. During unloading the critical path length and execution time of the block are decreased.

Figure 4A:
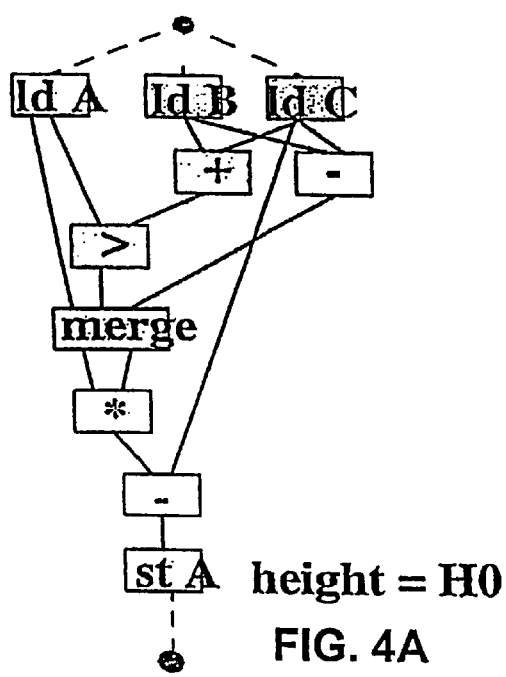
FIGS. 4A and 4B depict, respectively a hard ESB before and after migration of critical operations.
Figure 4B:
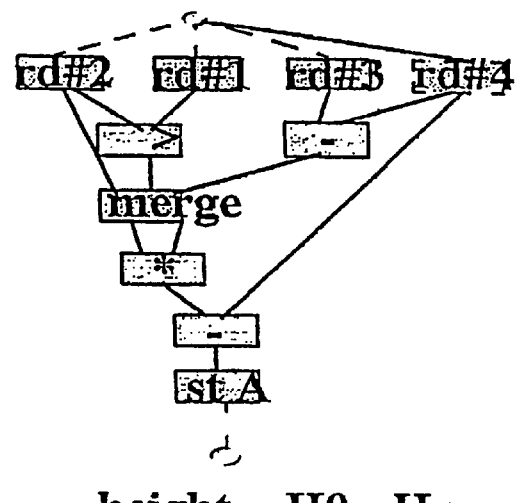

An example of unloading a "hard" ESB is depicted in FIGS. 4A and 4B which shows the target block before and after unloading. For example, a hard ESB before and after transformation is depicted in FIGS. 4A and 4B. There, critical operations are migrated in four iterations in this case.

Note the block in FIG. 4A includes 3 Ld ops which require dynamic access to memory and an Add op that must be completed prior to the condition evaluation operation. In a first iteration the Add operation, with it argument tree (Ld B and Ld C), is migrated out of the hard ESB and replaced by a Rd#1 (read register #1) op. The output of the Rd#1 op forms a first input of the condition evaluation operation. The copy of the Add op, with its argument tree (Ld B and Ld C), succeeded by a Wr#1 operation, is inserted into the subgraph. In a second iteration, the LdA operation is migrated out of the hard ESB and replaced by a Rd#2 op and the output is passed to the condition evaluation operation and the merge operation. Also the copy of Ld A op succeeded by Wr#2 is inserted in the the subgraph.

Also, the copy of the Ld B operation inserted into the subgraph in the first iteration is succeeded by a Wr#3 operation. Finally, in the fourth iteration the Ld C op is migrated out of the hard ESB and replaced by a Rd#4 operation. Also, the copy of Ld C operation inserted into the subgraph in the first iteration is succeeded by a Wr#4 operation. Such copies of the operations in the subgraph are inserted and scheduled in parallel with the operations of each control flow predecessor.

Therefore, as a result of hard ESB unloading, the height of the hard ESB has been reduced. The Add operation has been migrated to the subgraph and is completed prior to the execution of the operations in the hard ESB after unload are scheduled. This allows the condition evaluation operation and Sub operations to be scheduled in parallel. Also, the replacement of Ld operations with Rd operations in the target ESB reduces the time needed to be scheduled for the ESB.

Because the target block has been selected according to the criteria described above, the operations migrated from the control block can be executed as additional code merged with the code of each control predecessor block. These migrated operations are executed utilizing available resources not consumed by previously existing predecessor block operations or are executed inside least frequently executed predecessor blocks so that the execution time of the predecessor block is not substantially increased.

Thus, by unloading the hard ESB, the critical path and the number of operations of the target block and, consequently, the block execution time, are reduced. To obtain a decrement of the overall execution time of a program and achieve the effect of optimization, it is required that the sum of the execution times of the target block's control flow predecessors do not change or increase less than decrease in execution time of the hard ESB after the migration of critical operations to the control flow predecessors.

As described above, the overall execution time is decreased if the execution counter of a target block's predecessor is much less than the execution counter of the target block itself, or if the block's predecessor has enough free resources to execute the migrated operations in parallel without changing (or slightly changing) the length of the critical path. Thus, optimization is directed to provide more uniform and parallel distribution of operations between different code regions and to reduce the time of program running.

Figure 6:
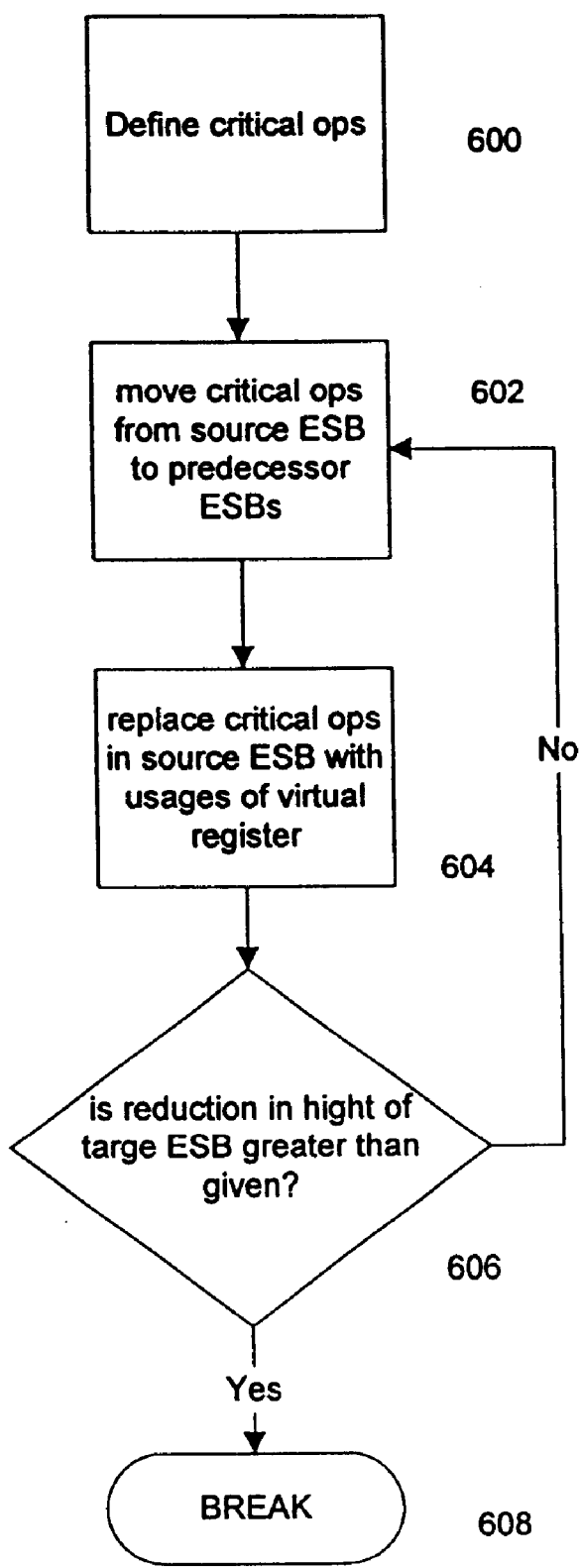
FIG. 6 is a flow chart depicting steps for unloading a hard ESB.

The operations performed by the compiler to implement unloading a "hard" ESB will now be described with reference to the following psuedo-code and the flow charts of FIGS. 6 and 7.

1). Define critical a operation to move out from the ESB. Analyzing all critical paths from the beginning of ESB in some range of operation latest start times with respect to the overall height of the block to define a critical operation. This range is given as a parameter or estimated by means of algorithm heuristics. The operations with the dynamic access time (load), large operation delay (divide, square root, etc.), and the number of operation result usage (more than two) are considered. This operations set is sorted by the value of the latest start time (the most close to upper bound of range) and the number of operation result usage. As a result, the critical operation (crit_op) is chosen with the maximum value of the latest start time as a first criteria, and the maximum number of operation result usage as a second criteria.

IF crit_op is not defined
THEN
    Optimization is break.
ENDIF
2). Move critical operation crit_op from ESB.
Get new virtual register (cur_virt_reg) needed for migration.
(It may be treated as compiler temporary variable too).
FOREACH control flow predecessor of ESB (pred_b1) do the following.
By means of a recursive pass of the operation argument tree of crit_op, copy and insert each operation by operation from the terms of the argument tree up to crit_op (in direction of operand to operation) to the block pred_b1. (In the example above, while copying addition operation, the load operations Ld B and Ld C will be copied at first and addition operation subsequently. Operations which may evaluate arguments of the load operation are omited in the above example (consider its as constants), but they may be in common case and should be copied before load operation copying.) As result copy_crit_op will be generated on the pred_b1. Then write (or set) the result of copy_crit_op to virtual register cur_virt_reg.
ENDFOR
Replace all usages of crit_op result (data flow successors) by read (or usage) of virtual register cur_virt_reg. (There are distinguished nodes for virtual register write and read in the above example of dependence graph for evidence, but the virtual register usage in operations may be shown as operand attribute in other notation). Remove crit_op and each operation from it's arguments tree recursively if it isn't used after transformation.
3). Get obtained height of block (Hesb).
IF difference between initial height of block Hesb0 and
    Hesb
(Hesb0–Hesb) greater than given (and/or desired) difference
or the number of iterations greater than given maximum of iterations
THEN
    Optimization is break.
ELSE
    Continue unload considered ESB from the step 1.
ENDIF
(There are four iterations in considered example:
    1) addition operation motion;
    2) load operation LD A motion;
    3) load operation LD B motion;
    4) load operation LD C motion and then break.)
ENDFOR Referring to FIG. 6, in step 600 the critical operations in a target ESB, i.e., a block that qualifies as "hard" according to the criteria described above. In step 602 the critcal operations are moved to the predecessor ESBs of the target "hard" ESB.

Figure 5:
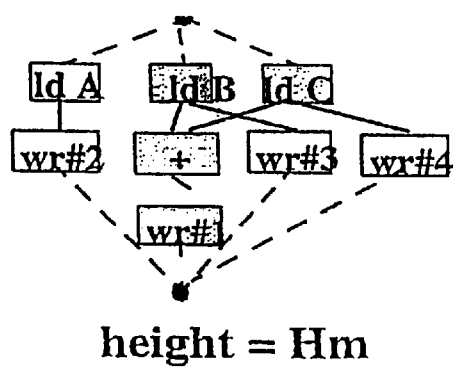
FIG. 5 is a subgraph depicting operations migrated from the hard ESB.
Figure 7:
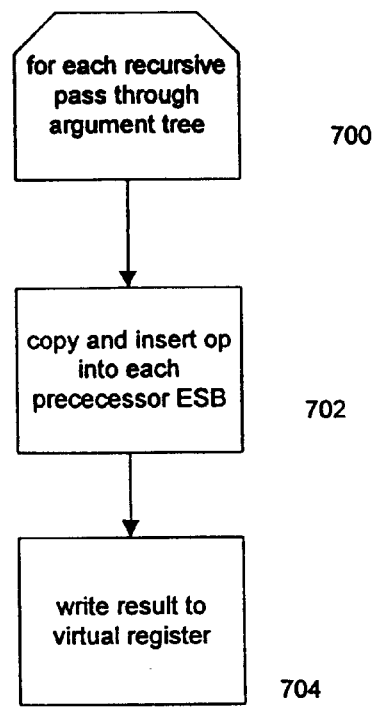
FIG. 7 is a flow chart depicting steps for migrating operations from a hard ESB.

This step is defined in more detail in FIG. 7. In step 700 a recursive pass is made through the argument tree of a critical operation in the direction of operand to operation. For example, in FIG. 4A the argument tree of Add is Ld B and Ld C. Each operation is copied and inserted into the predecessor block in step 702 and the results are written to a virtual register in step 704. For example, in FIG. 5, the Add op has its operand result written to the virtual register #1.

Returning to FIG. 6, critical ops in the source ESB are replace by reads (usages) of the virtual register 604. For example, in FIG. 2 the Add critical op is replaced by rd #1.

Finally, in step 606 the reduced height of the block is compared to a given reduction height. If the reduced height is greater than the optimization is complete.

Figure 8:
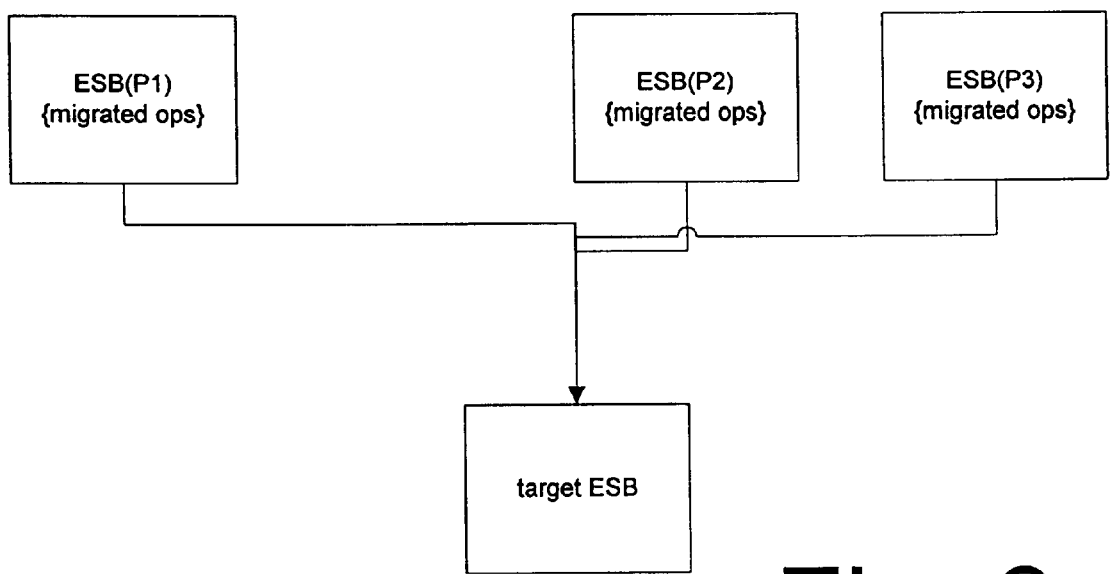
FIG. 8 depicts an ESB with multiple control flow predecessors.

As depicted in FIG. 8, if the source ESB, i.e., the ESB having critical operations migrated out, may be entered from multiple control flow predecessors then the critical ops have to be migrated to each control flow predecessor so the values will be written to the virtual register regardless of which control flow predecessor transfers control to the source ESB.

In a preferred embodiment the invention implemented by software stored as program code on a computer readable media which may include magnetic storage media, optical storage media, signals modulated on electromagnetic waves, or other types of media. The program code is read from the media and executed by a digital processor.

The invention has now been described with reference to the preferred embodiments. Alternatives and substitutions will now be apparent to persons of skill in the art. Accordingly, it is not intended to limit the invention except as provided by the appended claims.

What is claimed is:

1. A method, performed by a compiler, of reducing the execution time of a program including a number of blocks in control flow order, said method comprising the acts of:

assigning a hardness parameter to each block indicating the amount of resources required to execute the block;

comparing each assigned hardness parameter to an external boundary parameter to identify target blocks that require excessive resources to execute;

for each target block, comparing the hardness parameter of target block to the hardness parameter a target blocks predecessor; and if the hardness parameter of the target block is greater than the hardness parameter of the predecessor block, migrating critical operations out of the target block to be executed in parallel inside the predecessor block.

2. A method, performed by a compiler, of reducing the execution time of a program including a number of blocks in control flow order, said method comprising the acts of:

assigning a hardness parameter to each block indicating the amount of resources required to execute the block;

comparing each assigned hardness parameter to an external boundary parameter to identify target blocks that require excessive resources to execute;

for each target block with a plurality of predecessor blocks, comparing the hardness parameter of target block to the hardness parameter of each of the target block's predecessors; and if the hardness parameter of the target block is greater than the hardness parameter of each of the predecessor blocks, migrating critical operations out of the target block to be executed in parallel inside each predecessor block.

3. The method of claim 2 where said act of comparing comprises:

migrating operations from the target block if (C(B)>>C(Bpred)) is true, where C(B) is the execution counter of the target block, C(Bpred) is the execution counter of the predecessor block.

4. The method of claim 1 where said act of assigning a hardness parameter comprises the acts of:

setting the hardness parameter equal to a combination of an execution counter parameter of the block and number of operations parameter.

5. The method of claim 4 where said act of comparing comprises:

migrating operations from the target block if (C(B)≧C(Bpred) and (W(B)−W(Bpred) >Wdiff0)) is true, where C(B) is the execution counter of the target block, C(Bpred) is the execution counter of the predecessor block, W(B) is the number of operations parameter of the target block, W(Bpred) is the number of operations parameter of the predecessor block, and Wdiff0 is an external boundary parameter.

6. A method for unloading operations from a scheduled extended scalar block of operations with the extended scalar block having a scheduled time of execution longer than optimal; with the extended scalar block preceded by other control flow predecessor operations, said method comprising the acts of:

identifying as critical operations those operation in the scheduled extended scalar block with the longest execution time;

iteratively migrating critical operations from said critical extended scalar block to a control flow predecessor block of scheduled operations; and replacing migrated critical operations with non-critical operations to reduce scheduled execution time of the extended scalar block.

7. The method of claim 6 where said critical operation is a load operation and where said method further comprising the acts of:

migrating said load operation followed by a write register operation to a control flow predecessor, with the write register operation writing the result of said load to a specified register; and replacing the load operation in the scheduled extended scalar block with a read register operation which reads the result from the specified register.

8. The method of claim 6 where said critical operation is a load operation followed by a specific operation with multiple successor operations scheduled in said extended scalar block, with the specific operation operating on the result of the load operation, said method further comprising the steps of:

migrating said load operation, said specific operation, and a write register operation, following said specific operation, to each control flow predecessor block, with the write register operation writing the result of said specific operation to a specified register; and replacing the specific operation in the scheduled extended scalar block with a read register operation which reads the result from the specified register.

9. A computer program product comprising:

a computer readable medium having program code for implementing compiler operations to balance Extended Scalar Blocks (ESBs) in a control flow, said program code comprising:

program code for causing a computer to identify critical operations in a source ESB;

program code for causing a computer to recursively pass an argument tree for each identified critical block and copy and insert each operation in the argument tree into each control flow predecessor of the source ESB and to get a virtual register needed for inserted operations;

program code for causing a computer to for insert write operations after each copied critical operation in the control flow predecessor for setting the result operand in a virtual register;

program code for causing a computer to critical operations and operations in the argument tree with a read operation that reads the result of critical operations migrated to the control flow predecessor from the virtual registers so that the height of the source ESB is reduced.

10. The computer program product of claim 9 with said computer code further comprising:

program code for causing a computer to test whether the difference between the height of the source ESB after migration of critical operations and the height before critical operations is greater than a selected height and;

program code for causing a computer to end the optimization if yes and for continuing the optimization if no.

11. A method, performed by a compiler, of reducing the execution time of a program including a number of blocks in control flow order, said method comprising the acts of:

assigning a hardness parameter to each block indicating the amount of resources required to execute the block, the hardness parameter being equal to a combination of an execution counter parameter of the block and number of operations parameter;

comparing each assigned hardness parameter to an external boundary parameter to identify target blocks that require excessive resources to execute;

for each target block with a plurality of predecessor blocks, comparing the hardness parameter of target block to the hardness parameter of each of the target block's predecessors;

if the hardness parameter of the target block is greater than the hardness parameter of each of the predecessor blocks, migrating critical operations out of the target block to be executed in parallel inside each predecessor block; and wherein said act of comparing comprises migrating operations from the target block if $(C(B) \geq C(Bpred)$ and $(W(B)-W(Bpred) > Wdiff0))$ is true, where $C(B)$ is the execution counter of the target block, $C(Bpred)$ is the execution counter of the predecessor block, $W(B)$ is the number of operations parameter of the target block, $W(Bpred)$ is the number of operations parameter of the predecessor block, and $Wdiff0$ is an external boundary parameter.

12. A method of compiling a computer program given as a predicated intermediate representation including a number of extended scalar blocks in control flow order to reduce execution time of the program, the method including the steps of:

assigning a hardness parameter to each extended scalar block that is equal to a combination of an execution counter parameter C of such extended scalar block, obtained from profile data, and a weight parameter W calculated from a division of a number of operations of such extended scalar block by a value equal to a product of such extended scalar block critical path length in processor cycles and number of processor arithmetic channels;

identifying target blocks from all hard extended scalar blocks having an assigned hardness to unload said target blocks; and migrating critical operations out of each target hard extended scalar block to be executed in parallel inside each control flow predecessor block of said block.

13. The method of claim 12, wherein the assigning step further includes comparing each assigned hardness parameter to an external boundary parameter to mark the extended scalar blocks according to a relationship:

$C>C0$ and $W>W0$, where C0 is an external boundary execution counter parameter and W0 is an external boundary weight parameter.

14. The method of claim 12, where identifying step includes the steps of:

for each extended scalar block having one or more control flow predecessor blocks, comparing the hardness parameter of each extended scalar block to the hardness parameter of each predecessor extended scalar block of such extended scalar block, to identify such extended scalar block as the target hard extended scalar block if $((C>>(Bpred))$ or $(C \geq C(Bpred)$ and $(W-W(Bpred) > Wdiff0)))$ is true for each hard extended scalar block's predecessor block Bpred not equal to said block B, where $C(B)$ is the execution counter parameter of the hard extended scalar block, $C(Bpred)$ is the execution counter parameter of the predecessor block, $W(B)$ is the weight parameter of the bard extended scalar block, $W(Bpred)$ is the weight parameter of the predecessor block, and Wdiff0 is an external weight difference parameter.

15. The method of claim 1, where step (3) for each target hard extended scalar block further comprises the steps of:

a) calculating earliest and latest start times of operations and critical path length (height) of said target hard extended scalar block;

b) identifying a critical operation for migrating out of the scheduled said block;

c) migrating the critical operation and all operations in the argument tree of the critical operation from said block to each control flow predecessor block of said block;

d) replacing migrated critical operations with non-critical operations to reduce scheduled execution time of said target hard extended scalar block; and e) repeating all steps beginning from step a), if a result of check of said target hard extended scalar block unload is false.

16. The method of claim 5, where step b) comprises the steps of:

assigning empty set to a set of candidates for critical operation of the target hard extended scalar block;

including an operation in said set of operations if earliest start time of the operation is equal to latest start time of the operation, and if latest start time of the operation is less than a value of the upper bound of time range estimated as a product of the target hard extended scalar block height, and an external range coefficient and if the operation have one of the critical properties such as a dynamic memory access time, a large operation latency in accordance to target processor specification, or more than two operation result usage; and identifying as a critical operation the operation from said set of operations with the maximum value of latest start time of the operation as a first criteria, and the maximum number of operation result usages as a second criteria if several operations in said set of operations have said maximum value of latest start time of the operation.

17. The method of claim 5 where said critical operation or any operation in the argument tree of said critical operation may cause an exception after migration of these operations and where step c) further comprises the step of:

setting speculative execution mode to all copies of said critical operation and all operations in the argument tree of said critical operation after migration of these operations to each control flow predecessor block of said target hard extended scalar block.

18. The method of claim 5, where step e) comprises the steps of:

assigning false value to the result of said unload check;

assigning true value to the result of said unload check if the difference between the initial height of said target hard extended scalar block and the height of said target hard extended scalar block after migration of critical operations is greater than an external height difference parameter or if the number of unload iterations is greater than maximum of iterations estimated by means of algorithm heuristics.

19. A method, performed by a compiler, of reducing the execution time of a program including a number of blocks in control flow order, said method comprising the acts of:

assigning a hardness parameter to each block indicating the amount of resources required to execute the block, including setting the hardness parameter equal to a combination of an execution counter parameter of the block and number of operations parameter;

comparing each assigned hardness parameter to an external boundary parameter to identify target blocks that require excessive resources to execute, including migrating operations from the target block if ($C(B) \geq C(Bpred)$ and ($W(B)-W(Bpred)>Wdiff0$)) is true, where $C(B)$ is the execution counter of the target block, $C(Bpred)$ is the execution counter of the predecessor block, $W(B)$ is the number of operations parameter of the target block, $W(Bpred)$ is the number of operations parameter of the predecessor block, and $Wdiff0$ is an external boundary parameter;

for each target block, comparing the hardness parameter of such target block to the hardness parameter a target blocks predecessor; and if the hardness parameter of the target block is greater than the hardness parameter of the predecessor block, migrating critical operations out of the target block to be executed in parallel inside the predecessor block.

* * * * *